United States Patent [19]

Hidaka et al.

[11] Patent Number: 5,236,661

[45] Date of Patent: Aug. 17, 1993

[54] CHROMIUM-BASED WELD MATERIAL

[75] Inventors: Hiroaki Hidaka; Tsutomu Kuniya; Koichi Hanawa; Tomoyuki Oikawa, all of Kanagawa, Japan

[73] Assignee: Tosoh Corporation, Yamaguchi, Japan

[21] Appl. No.: 833,501

[22] Filed: Feb. 11, 1992

Related U.S. Application Data

[62] Division of Ser. No. 526,916, May 22, 1990, Pat. No. 5,126,106.

[51] Int. Cl.$^5$ .................. C22F 1/10; C22F 1/11
[52] U.S. Cl. ............................................ 420/428
[58] Field of Search ........................................ 420/428

[56] References Cited

U.S. PATENT DOCUMENTS 2,809,127 10/1957 Gibson .............................. 420/428
3,560,202 2/1971 Kawamoto ........................ 420/428
3,811,960 5/1974 Parry ................................. 420/428

Primary Examiner—Peter D. Rosenberg
Attorney, Agent, or Firm—Sughrue, Mion, Zinn, Macpeak & Seas

[57] ABSTRACT

A chromium weld material comprising chromium as a main component and either one of or an appropriate combination of elements selected from the group IVb metals of the periodic table, Al, metals belonging to the groups VIIb, VIII, and Ib of the periodic table, Nb, and Ta and, if desired, at least one of rare earth elements, a chromium rolled article comprising chromium as a main component and either one of or an appropriate combination of elements selected from Al, Ti, Zr, Hf, Y, rare earth elements, and elements belonging to the groups Vb, VIb, and VIIb of the periodic table, and a process for producing said rolled article by cross-rolling under specific temperature and output rate conditions are disclosed. The weld material provides a weld free from deterioration of mechanical characteristics. The rolled article exhibits excellent tensile characteristics. The process provides a rolled sheet of small thickness without causing craking.

5 Claims, 1 Drawing Sheet

CHROMIUM-BASED WELD MATERIAL

This is a divisional of application Ser. No. 07/526,916 filed May 22, 1990, now U.S. Pat. No. 5,126,106.

FIELD OF THE INVENTION

This invention relates to a weld material for repairs or joining of a base material comprising metallic chromium or a high chromium alloy which is widely used as an anticorrosion material (hereinafter referred to as chromium base material), a chromium rolled article useful as an anticorrosion material, and a process for producing the rolled article.

BACKGROUND OF THE INVENTION

Metallic chromium is excellent in resistance to acids, alkalis and other chemicals at high temperatures. However, because it is poor in low-temperature toughness and encounters difficulty in processing, rolled articles of chromium or chromium-based alloys have not substantially been put into practical use.

Known techniques for obtaining rolled articles of chromium or chromium-based alloys include (1) a method of producing rolled plates which comprises cold powder rolling, sintering, re-rolling, and annealing as described in JP-A-58-55502 (the term "JP-A" as used herein means an "unexamined published Japanese patent application"), (2) a method comprising sealing an alloy powder having a chromium content of at least 70% by weight into a metallic container at 150° to 800° C. under reduced pressure of $10^{-2}$ Torr or less, sintering the powder at 1000° to 1400° C. under a pressure of 200 kg/cm$^2$ or more in an inert atmosphere, and rolling the sintered body at 800° to 1350° C. as described in JP-B-60-58289 (the term "JP-B" as used herein means an "examined Japanese patent publication"), and (3) a method comprising sealing a metallic chromium powder having a purity of 99% or more or a molded article thereof into a sealing container and rolling it at 600° to 1000° C. to obtain rolled articles having a relative density of 95% or more as described in JP-A-62-103303.

However, each of these conventional methods has disadvantages as follows. Method (1) involves many complicated steps. According to this method, although gaps among powder particles are reduced to some extent, deformation of the particles per se hardly proceeds, resulting in production of a molded product having a low relative density. In method (2) wherein rolling is conducted at high temperatures, chromium tends to react with atmospheric oxygen or nitrogen, failing to obtain a high purity rolled article. Rolled articles obtained by method (3) have a low relative density.

In welding to chromium base materials used as anticorrosion materials, weld materials to be used generally have almost the same composition as the base materials.

Repairs or the like to chromium base materials by welding are usually carried out in an ordinary atmosphere, i.e., in air. Metallic chromium is very active in oxygen or nitrogen and, therefore, cannot be freed of oxidation or nitriding when exposed to the atmosphere, in particular, at high temperatures, for example, in a fused state. Hence, when fusion welding of chromium base materials is performed in the air, oxygen and nitrogen in the air are also dissolved into the high-temperature weld to form a solid solution, which seriously deteriorates mechanical properties of the weld.

As mentioned above, since a chromium base material is widely employed as a material of various structures due to its excellent anticorrosion properties, cases not infrequently occur in which it is subjected to high temperature treatments, such as fusion welding. Thus, the above-described deterioration of the weld in mechanical properties is sometimes a fatal defect.

SUMMARY OF THE INVENTION

The inventors of the present invention have found that chromium having incorporated thereinto certain kinds of elements is suitable as a weld material or a rolled article.

That is, this invention relates to a chromium weld material comprising chromium as a main component and either one of or an appropriate combination of elements selected from the group IVb metals of the periodic table as defined in *The Merck Index*, 11th Ed. (hereinafter the same), Al, metals belonging to the groups VIIb, VIII and Ib, Nb, and Ta of the periodic table and, if desired, at least one of rare earth elements.

The invention further relates to a chromium rolled article comprising chromium as a main component and either one of or an appropriate combination of elements selected from Al, Ti, Zr, Hf, Y, rare earth elements, and elements belonging to the groups Vb, VIb, and VIIb of the periodic table.

The invention furthermore relates to a process for producing the above-described chromium rolled article.

The terminology "rare earth elements" as used herein includes, in its broad sense, La, etc.

DETAILED DESCRIPTION OF THE INVENTION

Figure 1:
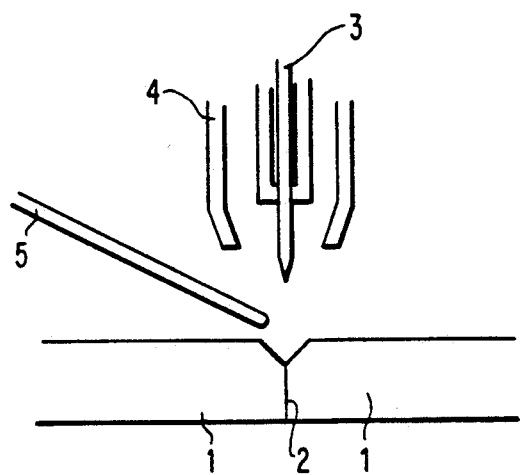
FIG. 1 illustrates a mode of tungsten inert gas (TIG) welding.

When a chromium base material is subjected to a high temperature treatment such as welding, causes of embrittlement of the treated area are roughly classified into (a) dissolution of oxygen or nitrogen in a state of solid solution into the treated area, (b) formation of a carbide, and (c) influences of thermal strain accompanied by abrupt temperature changes.

Countermeasures effective to eliminate these causes include (i) addition of a substance whose standard free energy for formation ($\Delta G^\circ$ f) of an oxide or a nitride is lower than that of chromium at the time of the treatment, (ii) addition of a substance whose standard free energy for formation of a carbide ($\Delta G^\circ$ f) is lower than that of chromium at the time of the treatment, and (iii) addition of an element which induces softening of an alloy to thereby alleviate the influences of thermal strain. Although the mechanism of these countermeasures largely remains unexplained, it is believed that addition of the above-described elements causes a change of the d-orientation possessed by chromium.

As a result of investigations on various additive elements, the inventors have found that (1) an element selected from the group consisting of the group IVb metals of the periodic table and Al (hereinafter referred to as group (1) element) and (4) an element selected from rare earth elements (hereinafter referred to as group (4) element) produce effect (i); that group (1) element and (3) an element selected from the group consisting of Nb and Ta (hereinafter referred to as group (3) element) produce effect (ii); and that (2) an element selected from the group consisting of the metals belonging to the groups VIIb, VIII, and Ib of the periodic table (hereinafter referred to as group (2) element) produces effect (iii).

The weld material according to the present invention comprises chromium as a main component and at least one of specific additive elements. The specific additive element is used in a amount usually of from 0.01 to 10% by weight based on the weld material, though somewhat varying depending on the kind of elements. More specifically, group (1) element including the group IVb metals of the periodic table (i.e., Ti, Zr, and Hf) and Al is used in a total amount of from 0.01 to 10% by weight. Group (2) element including the groups VIIb, VIII, and Ib metals of the periodic table (i.e., Mn, Re, Fe, Co, Ni, Ru, Rh, Pd, Os, Ir, Pt, Cu, Ag, and Au) or group (3) element including Nb and Ta is used in a total amount of from 0.01 to 8% by weight.

The above-described element groups may be used in combinations thereof. Where groups (1) and (2) are combined, the total amount of groups (1) and (2) is preferably from 0.02 to 15% by weight, with the amount of each element group falling within the respective range as recited above. Where groups (2) and (3) are further combined with group (4), i.e., a rare earth element (i.e., Sc, Y, La, Ce, Pr, Nd, Pm, Sm, Eu, Gd, Tb, Dy, Ho, Er, Tm, Yb, and Lu), groups (2), (3), and (4) are used in an amount of from 0.01 to 8% by weight, from 0.01 to 5% by weight, and from 0.01 to 8% by weight, respectively, with the total amount of groups (2), (3), and (4) being preferably within 15% by weight.

If the content of the additive element in the weld material is smaller than the respective lower limit, sufficient effects of addition cannot be expected. If it is larger than the upper limit, strain given by the additive element to the base material during welding, etc. becomes so high that the composition of the welded area, etc. is largely varied, sometimes resulting in embrittlement of the area.

While the above-described specific elements may be added to chromium either individually or in combination of two or more thereof, addition of only one kind of them would suffice for the purpose of obtaining at least the effect as expected in the present invention.

Substances which are present in a chromium matrix constituting a base material and adversely affect mechanical properties of the base material include, in addition to oxygen and nitrogen, carbon, silicon, phosphorus, etc. Among them, gaseous components, e.g., oxygen and nitrogen, have particularly pronounced influences on a chromium base material in a fused state, for example, during welding.

When a weld material containing the group (1) element is used, it is considered that Ti, Zr, Hf or Al present in the weld material enters into the welded area of the base material, where it is reacted not only with the dissolved oxygen or nitrogen component in the form of a solid solution but also with oxygen, nitrogen, carbon, etc. which are originally present as unavoidable impurities in the base material to thereby form a slag containing these impurities. The thus formed slag is released from the matrix of the base material, whereby the above-described impurity components can be removed. It appears that the slag is formed because the standard free energy for formation ($\Delta G° f$) of an oxide, a nitride or a carbide of Ti, Zr, Hf or Al is extremely lower than that for formation of chromium oxide, nitride or carbide. Thus, the resulting melt area, e.g., welded area, of the chromium base material has markedly reduced concentrations of oxygen, nitrogen, and carbon.

When a weld material containing the group (2) element is used, the treated area is observed to undergo a softening phenomenon, which brings about an improvement in mechanical properties. This appears to be because incorporation of the additive element into the treated area causes change of orientation of d-electrons possessed by chromium.

Further, when a weld material containing the group (3) element is used, the element enters into the treated area of a base material, and carbon present as chromium carbide in the base material is preferentially reacted with Nb or Ta due to a difference in standard free energy of formation ($\Delta G° f$). As a result, the treated area has a low carbon concentration, that is, hardly undergoes cracking.

Methods for producing the weld material according to the present invention are not particularly restricted as long as incorporation of impurity elements can be prevented and include melt molding and sinter molding. Sinter molding is preferred since melt molding involves a fear that molding components may locally crystallize in a crucible used for melting under some cooling conditions. In cases where a weld material is produced by sinter molding, it is necessary for the above-described specific additive elements to be sufficiently dispersed in chromium. To this effect, it is preferable that a part of a metallic chromium raw material and the additive element(s) are formulated into a base alloy by, for example, arc dissolving and, then, the resulting base alloy powder is mixed with the rest of the metallic chromium powder, followed by molding.

In an embodiment of sinter molding, an ingot of a base alloy is first prepared by arc dissolving of a metallic chromium powder having incorporated thereinto the specific additive element(s), and the ingot is ground to obtain an alloy powder having a particle size of from about 1 to 0.01 mm. It is preferable to use a metallic chromium powder having a high purity (e.g., 99.9% or higher) as a raw material and to remove fine particles of 0.01 mm or smaller, which exhibit relatively high activity, from the resulting alloy powder, whereby incorporation of impurities derived from the raw material or such fine particles into a weld material can be prevented.

The alloy powder is then mixed with the rest of a metallic chromium powder having a particle size of from about 1 to 0.01 mm. The mixing ratio is so adjusted as to obtain a desired content of the additive element(s) in the weld material.

The resulting mixed powder is sealed into a capsule in vacuo and treated at a high temperature under a high pressure to obtain a sintered body. The material of the capsule to be used is not particularly limited and includes, for example, iron, tungsten, and stainless steel. The high-temperature high-pressure treatment is usually carried out under a pressure of 200 kg/cm$^2$ or more, and preferably 500 kg/cm$^2$ or more. The treating temperature is usually 500° C. or higher and less than the melting point of the mixed powder. To accelerate sintering, a temperature of 1000° C. or higher and less than the melting point is preferred. The retention time is not particularly critical and is preferably at least 30 minutes.

The thus obtained sintered body is processed to obtain a weld material of any desired shape. Where a particularly complicated shape is desired, the sintered body is preferably processed by means of a wire cut and the like.

The weld material according to the present invention is applicable to any welding means, for example, various arc welding, electron beam welding, and resistance welding.

Rolled articles according to the present invention are described below.

Difficulty in processing of metallic chromium is considered ascribable to embrittlement due to impurity elements, such as oxygen, nitrogen, and carbon, because the crystal structure of chromium has a body-centered cubic lattice. The additive element according to the present invention is reacted with these impurity elements to form compounds whereby adverse influences of the impurities are excluded or mechanical characteristics of chromium per se are improved to reduce the adverse influences of the impurities.

The element which can be added to chromium is at least one member selected from the group consisting of Al, Ti, Zr, Hf, Y, rare earth elements, i.e., La, Ce, Pr, Nd, Pm, Em, Eu, Gd, Tb, Dy, Ho, Er, Tm, Yb, and Lu, the group Vb elements of the periodic table, i.e., V, Nb, and Ta, the group VIb elements of the periodic table, i.e., Mo and W, and the group VIIb elements of the periodic table, i.e., Mn, Tc, and Re.

These elements are added to chromium in a total amount ranging from 0.01 to 10 atm%. If the amount is less than 0.01 atm%, the effect of addition is insufficient. If it exceeds 10 atm%, the resulting rolled article suffers from strain.

The rolled article of the present invention can be produced by any of commonly employed processes. In particular, a process in which an alloy containing a prescribed amount of the above-described additive element(s) is subjected to cross-rolling at a temperature of from 200° to 700° C., which temperature is in the vicinity of the ductility-brittleness transition temperature, at a very low output rate, e.g., from 0.05 to 1 m/min. According to this process, the metallurgical structure of a chromium-based alloy ingot can be adjusted to eliminate directionality of the rolled article, and a chromium rolled article of a desired thickness can be obtained by repetition of rolling at a temperature within the above range without being accompanied by cracking. In order to obtain a rolled article having excellent tensile characteristics, the hot-rolling is preferably repeated up to a final draft of 70% or more. Within the above-recited temperature range, incorporation of oxygen and nitrogen into a rolled article can be inhibited to provide a high-toughness rolled article. Cross-rolling is performed by repeating rolling in a plurality of crossing directions by means of an ordinary rolling mill preferably to a draft of from 1 to 5% per each rolling. If the draft per each rolling is less than 1%, only the surface of the rolling stock is rolled out, with the inside structure remaining insufficiently adjusted. If it exceeds 5%, there is a fear that the metal suffers from cracking.

Metallic chromium to be used preferably has a high purity of 99.9% or more with traces of impurities, e.g., oxygen, nitrogen, and carbon. Such high purity metallic chromium can be obtained by electrolysis of a chromium salt solution or a method comprising purifying a chromium salt solution by solvent extraction, oxidizing the resulting high purity chromium salt, and reducing the salt.

Chromium-based alloy ingots to be rolled can be obtained by any means as long as they are protected from contamination with impurities, e.g., oxygen, nitrogen, and carbon. For example, chromium-based alloy ingots can be obtained by arc dissolving in an inert gas.

By the use of the weld material according to the present invention, even when a chromium-based base material is treated at high temperatures for repairs, welding, and the like, the treated area, e.g., a weld, undergoes no deterioration of mechanical properties and maintains quality equal to the base material.

Rolled articles of chromium having a purity of about 99.99%, which are industrially used at present, usually have an elongation of several percents. On the other hand, in accordance with the present invention, since (a) it is possible to adjust the organism thereof, (b) it is possible to minimize the influences by impurities, and (c) the mechanical properties can be improved by various effects such as an softening effect, etc., a rolled article of the present invention can have an elongation of about 20% or more as determined by tensile test at room temperature.

Further, the rolled article according to the present invention has excellent workability due to high malleability and high ductility as compared with conventional chromium rolled articles and can easily be processed into any desired shape. Therefore, the rolled article, either as it is or as processed, can be utilized as an equipment which is exposed to severe conditions, such as high temperatures, strong acids, strong alkalis, etc.

The aforementioned preferred process for producing the rolled article provides a chromium rolled article having toughness through relatively simple operations. Further, even when rolling is conducted at a high draft, a thin rolled article (rolled sheet) free from cracking can be obtained.

The present invention is now illustrated in greater detail with reference to Examples, but it should be understood that the present invention is not deemed to be limited thereto. All the percents are by weight unless otherwise indicated.

EXAMPLES 1 TO 12 AND COMPARATIVE
EXAMPLES 1 to 7

To 34 g of a high purity metallic chromium powder having impurity contents as shown in Table 1 below and a particle size of about 0.05 mm was added 6 g of a Ti powder having a purity of 99.9% and a particle size of about 0.05 mm, followed by thoroughly mixing by stirring. The mixed powder was melted by arc dissolving to obtain a button-shaped ingot. The ingot was ground in a stamping mill having stainless steel-made teeth to obtain an alloy powder having a particle size of about 0.05 mm.

The alloy powder was thoroughly mixed with 1960 g of the same metallic chromium powder as used above. The mixed powder was vacuum-sealed into a stainless steel container and treated at 1250° C. and 1850 kg/cm$^2$ for 60 minutes to obtain a sintered body. The resulting sintered body was cut with a wire cut to obtain a weld rod having a size of 2 mm×2 mm×200 mm and containing 0.3% of Ti.

A weld rod having a composition shown in Table 2 below was produced in the same manner as described above, except for changing the Ti content or using a Zr powder, an Hf powder or an Al powder each having a purity of 99.9% in place of or in addition to the Ti powder.

Weldability Test

Weldability test in tungsten inert gas (TIG) welding was carried out as illustrated in FIG. 1 by using each of the resulting weld rods and a chromium base material whose impurity content is shown in Table 1.

Tungsten electrode 3 containing 2% of thorium oxide and having a diameter of 3 mm was placed above welding base material 1 having notch 2 at the edge to be welded. This electrode 3 was brought close to the notched area, and a direct electric current of 170 A was applied thereto to generate an electric arc between base material 1 and electrode 3, by which weld rod 5 was fused and deposited along the notch while blowing an inert gas, e.g., argon, at the area to be welded from gas nozzle 4 surrounding electrode 3 to thereby exclude influences of the atmosphere.

Mechanical properties of the resulting weld were evaluated in terms of tensile strength and elongation in accordance with the test methods specified in JIS Z2201, Z2241 and B7721, and the results obtained are shown in Table 2.

For comparison, a weld rod comprising only metallic chromium having the same composition as the base material used in the weldability test (Comparative Example 1) and weld rods containing Ti, Zr, Hf or Al in an amount shown in Table 2 (Comparative Examples 2 to 7) were prepared in the same manner as described above and evaluated for weldability and mechanical properties. The results obtained are also shown in Table 2.

TABLE 1

| Element | Impurities in Metallic Chromium (ppm) | |
|---|---|---|
| | Weld Material | Base Material |
| Fe | 160 | 70 |
| Ni | 4 | 10 |
| Pb | 1 | 1 |
| Cu | 2 | 1 |
| P | 2 | 20 |
| S | 9 | 10 |
| Si | 30 | 6 |
| Al | 5 | 20 |
| C | 5 | 60 |
| O | 110 | 40 |
| N | 4 | 30 |
| H | 3 | 5 |

TABLE 2

| Example No. | Composition of Weld Rod | | | | | Tensile Strength (MPa) | Elongation (%) |
|---|---|---|---|---|---|---|---|
| | Ti (%) | Zr (%) | Hf (%) | Al (%) | Cr (%) | | |
| Example 1 | 0.3 | 0 | 0 | 0 | BAL* | 320 | 14 |
| Example 2 | 0.5 | 0 | 0 | 0 | " | 370 | 18 |
| Example 3 | 0 | 0.1 | 0 | 0 | " | 300 | 10 |
| Example 4 | 0 | 0.3 | 0 | 0 | " | 330 | 12 |
| Example 5 | 0 | 0 | 0.1 | 0 | " | 300 | 10 |
| Example 6 | 0 | 0 | 0.3 | 0 | " | 310 | 10 |
| Example 7 | 0 | 0 | 0 | 0.1 | " | 310 | 14 |
| Example 8 | 0 | 0 | 0 | 2 | " | 370 | 17 |
| Example 9 | 0.1 | 0 | 0 | 1 | " | 360 | 16 |
| Example 10 | 0 | 0.3 | 0 | 1 | " | 350 | 16 |
| Example 11 | 0.5 | 0 | 0.1 | 0 | " | 300 | 14 |
| Example 12 | 0 | 0.2 | 0.2 | 0 | " | 320 | 10 |
| Comparative Example 1 | 0 | 0 | 0 | 0 | 99.98 | 280 | 6 |
| Comparative Example 2 | 0.003 | 0 | 0 | 0 | BAL* | 280 | 6 |
| Comparative Example 3 | 0 | 15 | 0 | 0 | " | 260 | 5 |
| Comparative Example 4 | 0 | 0 | 0.003 | 0 | " | 280 | 6 |
| Comparative Example 5 | 0 | 0 | 0 | 15 | " | 260 | 5 |
| Comparative Example 6 | 5 | 0 | 0 | 10 | " | 275 | 6 |
| Comparative Example 7 | 0 | 10 | 5 | 0 | " | 270 | 7 |

Note: *BAL: Balance (hereinafter the same)

It can be seen from the results in Table 2 that the weld formed from a weld material having the same composition as a base material (Comparative Example 1) has extremely lower tensile strength and elongation as compared with the weld formed from the weld material according to the present invention. It was also ascertained that addition of less than 0.01% of the additive element produces only a little effect (Comparative Examples 2 and 4) and that addition of more than 10% of the additive element results in reduction of plastic deformability of the weld due to adverse influences of the element added (Comparative Examples 3, 5, 6, and 7).

EXAMPLES 13 TO 24 AND COMPARATIVE EXAMPLES 8 TO 13

To 34 g of the same metallic chromium powder as used in Example 1 was added 6 g of a Co powder having a purity of 99.9% and a particle size of about 0.05 mm, and the mixture was thoroughly mixed by stirring. The mixed powder was melted by arc dissolving to obtain a button-shaped ingot. The ingot was ground in a stamping mill having stainless steel-made teeth to obtain an alloy powder having a particle size of about 0.05 mm.

The alloy powder was thoroughly mixed with 1960 g of the same metallic chromium powder as used above, and the resulting mixed powder was treated in the same manner as in Example 1 to obtain a sintered body. The sintered body was cut with a wire cut to obtain a weld rod having a size of 2 mm×2 mm×200 mm and containing 0.3% of Co.

Further, a weld rod was produced in the same manner as described above, except for changing the Co content or using an Re powder having a purity of 99.99%, an Ru powder having a purity of 99.99%, or an Ag powder having a purity of 99.9999% in place of or in addition to the Co powder as shown in Table 3 below.

For comparison, a weld rod was produced in the same manner as described above, except for changing the composition of the weld as shown in Table 3.

Each of the resulting weld rods was evaluated in the same manner as in Example 1. The results obtained are shown in Table 3.

TABLE 3

| Example No. | Composition of Weld Rod | | | | | Tensile Strength (MPa) | Elongation (%) |
|---|---|---|---|---|---|---|---|
| | Co (%) | Re (%) | Ag (%) | Ru (%) | Cr (%) | | |
| Example 13 | 0.3 | 0 | 0 | 0 | BAL | 350 | 16 |
| Example 14 | 1 | 0 | 0 | 0 | " | 370 | 18 |
| Example 15 | 0 | 0.5 | 0 | 0 | " | 300 | 10 |
| Example 16 | 0 | 2 | 0 | 0 | " | 330 | 12 |

TABLE 3-continued

| Example No. | Composition of Weld Rod | | | | | Tensile Strength (MPa) | Elongation (%) |
|---|---|---|---|---|---|---|---|
| | Co (%) | Re (%) | Ag (%) | Ru (%) | Cr (%) | | |
| Example 17 | 0 | 0 | 2 | 0 | " | 300 | 10 |
| Example 18 | 0 | 0 | 3 | 0 | " | 310 | 10 |
| Example 19 | 0 | 0 | 0 | 3 | " | 370 | 18 |
| Example 20 | 0 | 0 | 0 | 6 | " | 360 | 17 |
| Example 21 | 0.1 | 0 | 0 | 1 | " | 360 | 18 |
| Example 22 | 0 | 0.3 | 0 | 1 | " | 350 | 16 |
| Example 23 | 0.3 | 0 | 2 | 0 | " | 350 | 14 |
| Example 24 | 0 | 0.3 | 3 | 0 | " | 330 | 12 |
| Comparative Example 1 | 0 | 0 | 0 | 0 | 99.98 | 280 | 6 |
| Comparative Example 8 | 0.003 | 0 | 0 | 0 | BAL | 280 | 6 |
| Comparative Example 9 | 0 | 10 | 0 | 0 | " | 275 | 6 |
| Comparative Example 10 | 0 | 0 | 0.003 | 0 | " | 280 | 6 |
| Comparative Example 11 | 0 | 0 | 0 | 10 | " | 260 | 5 |
| Comparative Example 12 | 5 | 0 | 0 | 5 | " | 275 | 6 |
| Comparative Example 13 | 0 | 5 | 5 | 0 | " | 270 | 7 |

It can be seen from the results in Table 3 that the weld formed from a weld material having the same composition as a base material (Comparative Example 1) has extremely lower tensile strength and elongation as compared with the weld formed from weld material of the present invention. It was also ascertained that addition of less than 0.01% of the additive element produces only a little effect (Comparative Examples 8 and 10) and that addition of more than 8% of the additive element results in reduction of plastic deformability of the weld due to adverse influences of the element added (Comparative Examples 9, 11, 12, and 13).

EXAMPLES 25 TO 30 AND COMPARATIVE EXAMPLES 14 TO 16

To 90 g of the same metallic chromium powder as used in Example 1 were added 6 g of a Ti powder and 4 g of a Co powder each having a purity of 99.99% and a particle size of about 0.05 mm, and the mixture was thoroughly mixed by stirring. The mixture was treated in the same manner as in Example 1 to obtain an alloy powder having a particle size of about 0.05 mm.

The alloy powder was thoroughly mixed with 1900 g of the same metallic chromium powder as used above, and the resulting mixed powder was treated in the same manner as in Example 1 to obtain a sintered body. The sintered body was cut with a wire cut to obtain a weld rod having a size of 2 mm×2 mm×200 mm and containing 0.3% of Ti and 0.2% of Co.

Further, a weld rod was produced in the same manner as described above, except for changing the Ti and Co contents or using an Al powder or an Ru powder each having a purity of 99.99% in place of or in addition to the Ti and Co powders as shown in Table 4 below.

For comparison, a weld rod was produced in the same manner as described above, except for changing the composition of the weld as shown in Table 4.

Each of the resulting weld rods was evaluated in the same manner as in Example 1. The results obtained are shown in Table 4.

TABLE 4

| Example No. | Composition of Weld Rod | | | | | Tensile Strength (MPa) | Elongation (%) |
|---|---|---|---|---|---|---|---|
| | Ti (%) | Co (%) | Al (%) | Ru (%) | Cr (%) | | |
| Example 25 | 0.3 | 0.2 | 0 | 0 | BAL | 390 | 18 |
| Example 26 | 0.5 | 0.1 | 0 | 0 | " | 380 | 18 |
| Example 27 | 0 | 0 | 1.5 | 2 | " | 380 | 17 |
| Example 28 | 0 | 0 | 2 | 1 | " | 370 | 16 |
| Example 29 | 0.5 | 0 | 0 | 1 | " | 370 | 16 |
| Example 30 | 0 | 0.1 | 2 | 0 | " | 360 | 16 |
| Comparative Example 1 | 0 | 0 | 0 | 0 | 99.98 | 280 | 6 |
| Comparative Example 14 | 10 | 8 | 0 | 0 | BAL | 260 | 5 |
| Comparative Example 15 | 0.003 | 0.003 | 0 | 0 | " | 280 | 6 |
| Comparative Example 16 | 0 | 0 | 10 | 10 | " | 265 | 5 |

It can be seen from the results in Table 4 that the weld formed from a weld material having the same composition as a base material (Comparative Example 1) has extremely lower tensile strength and elongation as compared with the weld formed from weld material of the present invention. It was also ascertained that addition of less than 0.01% of the additive element produces only a little effect (Comparative Example 15) and that addition of more than 15% of the additive element results in reduction of plastic deformability of the weld due to adverse influences of the element added (Comparative Examples 14 and 16).

EXAMPLES 31 TO 35 AND COMPARATIVE EXAMPLES 17 TO 19

To 31 g of the same metallic chromium powder as used in Example 1 was added 9 g of an Nb powder having a purity of 99.99% and a particle size of about 0.05 mm, and the mixture was thoroughly mixed by stirring. The mixture was treated in the same manner as in Example 1 to obtain an alloy powder.

The alloy powder was thoroughly mixed with 1960 g of the same metallic chromium powder as used above, and the resulting mixed powder was treated in the same manner as in Example 1 to obtain a sintered body. The sintered body was cut with a wire cut to obtain a weld rod having a size of 2 mm×2 mm×200 mm and containing 0.45% of Nb.

Further, a weld rod was produced in the same manner as described above, except for changing the Nb content or using a Ta powder having a purity of 99.99% in place of or in addition to the Nb powder as shown in Table 5 below.

For comparison, a weld rod was produced in the same manner as described above, except for changing the composition of the weld as shown in Table 5.

Each of the resulting weld rods was evaluated in the same manner as in Example 1. The results are shown in Table 5.

TABLE 5

| Example No. | Nb (%) | Ta (%) | Cr (%) | Tensile Strength (MPa) | Elongation (%) |
|---|---|---|---|---|---|
| Example 31 | 0.45 | 0 | BAL | 350 | 16 |
| Example 32 | 1 | 0 | " | 370 | 18 |
| Example 33 | 0 | 1 | " | 300 | 10 |
| Example 34 | 0 | 1.5 | " | 350 | 16 |
| Example 35 | 0.3 | 0.5 | " | 350 | 16 |
| Comparative Example 1 | 0 | 0 | 99.98 | 280 | 6 |
| Comparative Example 17 | 0.003 | 0 | BAL | 280 | 6 |
| Comparative Example 18 | 0 | 0.003 | " | 280 | 6 |
| Comparative Example 19 | 10 | 10 | " | 270 | 6 |

It can be seen from the results in Table 5 that the weld formed from a weld material having the same composition as a base material (Comparative Example 1) has extremely lower tensile strength and elongation as compared with the weld formed from weld material of the present invention. It was also ascertained that addition of less than 0.01% of the additive element produces only a little effect (Comparative Examples 17 and 18) and that addition of more than 8% of the additive element results in reduction of plastic deformability of the weld due to adverse influences of the element added (Comparative Example 19).

EXAMPLES 36 TO 38 AND COMPARATIVE EXAMPLES 20 TO 21

To 230 g of the same metallic chromium powder as used in Example 1 were added 6 g of an La powder, 4 g of an Nb powder, and 60 g of an Re powder each having a purity of 99.99% and a particle size of about 0.05 mm, and the mixture was thoroughly mixed by stirring. The mixture was treated in the same manner as in Example 1 to obtain an alloy powder.

The alloy powder was thoroughly mixed with 1700 g of the same metallic chromium powder as used above, and the resulting mixed powder was treated in the same manner as in Example 1 to obtain a sintered body. The sintered body was cut with a wire cut to obtain a weld rod having a size of 2 mm×2 mm×200 mm and containing 0.3% of La, 0.2% of Nb, and 3% of Re.

Further, a weld rod was produced in the same manner as described above, except for changing the La, Nb and Re contents or using a Ce powder, an Nb powder or a Co powder each having a purity of 99.9% or more in place of or in addition to the La, Nb and Re powders as shown in Table 6 below.

For comparison, a weld rod was produced in the same manner as described above, except for changing the composition of the weld as shown in Table 6.

Each of the resulting weld rods was evaluated in the same manner as in Example 1. The results obtained are shown in Table 6.

TABLE 6

| Example No. | La (%) | Ce (%) | Nb (%) | Co (%) | Re (%) | Cr (%) | Tensile Strength (MPa) | Elongation (%) |
|---|---|---|---|---|---|---|---|---|
| Example 36 | 0.3 | 0 | 0.2 | 0 | 3 | BAL | 380 | 18 |
| Example 37 | 0.2 | 0 | 0.45 | 0 | 2 | " | 385 | 18 |
| Example 38 | 0 | 0.25 | 0.2 | 0.2 | 0 | " | 360 | 16 |
| Comparative Example 1 | 0 | 0 | 0 | 0 | 0 | 99.99 | 280 | 6 |
| Comparative Example 20 | 0 | 0.003 | 0.003 | 0 | 0 | BAL | 280 | 6 |
| Comparative Example 21 | 10 | 0 | 5 | 0 | 5 | " | 260 | 6 |

It can be seen from the results in Table 6 that the weld formed from a weld material having the same composition as a base material (Comparative Example 1) has extremely lower tensile strength and elongation as compared with the weld formed from weld material of the present invention. It was also ascertained that too a small content of the additive elements produces only a little effect (Comparative Example 20) and that too a high content of the additive elements results in reduction of plastic deformability of the weld due to adverse influences of the elements added (Comparative Example 21).

EXAMPLE 39

A mixture comprising 300 g of metallic chromium containing 0.015% of Fe, 0.003% of C, 0.03% of O, 0.004% of N, and 0.012% of Si as impurities and 0.5 g of metallic vanadium having a purity of 99.9% was melted in an inert gas-arc furnace (Max.: 1000 A, 20 V) in an argon atmosphere at atmospheric pressure to obtain 285 g of an ingot. A chromium-based alloy ingot (3 cm×5 cm×1 cm) was prepared from the ingot, and the alloy ingot was inserted into a hot rolling mill having a roll diameter of 200 mm and rolled out 5 times in crossing directions at 450° C. at an output rate of 0.1 m/min to a draft of 3% per each rolling. Then, the temperature was elevated to 500° C., and rolling was further conducted until the draft reached 95%. After cooling, a specimen for tensile test was cut out from the resulting rolled sheet. As a result of tensile test conducted at room temperature, the specimen had an elongation of 21%.

EXAMPLES 40 TO 46

A chromium-based alloy ingot was prepared in the same manner as in Example 39, except for replacing 0.5 g of metallic vanadium with additive elements each having a purity of 99.9% as shown in Table 7 below. The resulting alloy ingot was subjected to cross-rolling under conditions shown in Table 7. Tensile characteristics of the resulting rolled sheet are also shown in Table 7.

TABLE 7

| Example No. | Element Added Kind | Element Added Amount (atm %) | Rolling Conditions Temp. (°C.) | Rolling Conditions Output Rate (m/min) | Rolling Conditions Draft (%) | Elongation (%) |
|---|---|---|---|---|---|---|
| 40 | V | 0.1 | 300 | 0.5 | 80 | 18 |
| 41 | V | 1.0 | 500 | 0.5 | 90 | 15 |
| 42 | Nb | 0.3 | 300 | 0.1 | 95 | 25 |
| 43 | Nb | 0.5 | 500 | 0.1 | 80 | 19 |
| 44 | Ta | 0.5 | 500 | 0.1 | 90 | 22 |

TABLE 7-continued

| Example No. | Element Added Kind | Amount (atm %) | Rolling Conditions Temp. (°C.) | Output Rate (m/min) | Draft (%) | Elongation (%) |
|---|---|---|---|---|---|---|
| 45 | V | 0.1 | 400 | 0.2 | 80 | 22 |
|    | Nb | 0.3 |   |   |   |   |
| 46 | V | 0.2 | 400 | 0.3 | 85 | 16 |
|    | Ta | 0.5 |   |   |   |   |

EXAMPLE 47

A rolled sheet was produced in the same manner as in Example 39, except for using 0.2 g of metallic aluminum having a purity of 99.9% in place of metallic vanadium and conducting the rolling after cross-rolling at 400° C. As a result of tensile test, the specimen had an elongation of 23%.

EXAMPLES 48 TO 55

A chromium-based alloy ingot was prepared in the same manner as in Example 47, except for changing the amount or kind of the additive element as shown in Table 8 below. The elements used each had a purity of 99.9%. The alloy ingot was subjected to cross-rolling under conditions shown in Table 8. The tensile characteristics of the resulting rolled sheet is also shown in Table 8.

TABLE 8

| Example No. | Element Added Kind | Amount (atm %) | Rolling Conditions Temp. (°C.) | Output Rate (m/min) | Draft (%) | Elongation (%) |
|---|---|---|---|---|---|---|
| 48 | Al | 0.1 | 300 | 0.2 | 80 | 18 |
| 49 | Al | 3.0 | 600 | 0.3 | 90 | 21 |
| 50 | Ti | 0.1 | 300 | 0.1 | 90 | 22 |
| 51 | Ti | 0.5 | 500 | 0.2 | 90 | 17 |
| 52 | Ti | 6.0 | 600 | 0.5 | 95 | 16 |
| 53 | Zr | 0.05 | 400 | 0.2 | 90 | 23 |
| 54 | Zr | 3.0 | 500 | 0.2 | 80 | 15 |
| 55 | Al | 0.3 | 500 | 0.1 | 90 | 23 |
|    | Ti | 0.3 |   |   |   |   |

EXAMPLE 56

A rolled sheet was produced in the same manner as in Example 47, except for using 0.3 g of metallic lanthanum having a purity of 99.9% in place of metallic aluminum. The resulting rolled sheet had an elongation of 25%.

EXAMPLES 57 TO 62

A chromium-based alloy ingot was prepared in the same manner as in Example 56, except for changing the amount or kind of the additive element as shown in Table 9 below. The elements used each had a purity of 99.9%. The alloy ingot was subjected to cross-rolling under conditions shown in Table 9. The tensile characteristics of the resulting rolled sheet is also shown in Table 9.

TABLE 9

| Example No. | Element Added Kind | Amount (atm %) | Rolling Conditions Temp. (°C.) | Output Rate (m/min) | Draft (%) | Elongation (%) |
|---|---|---|---|---|---|---|
| 57 | La | 0.02 | 300 | 0.2 | 95 | 23 |
| 58 | La | 0.1 | 500 | 0.3 | 80 | 15 |
| 59 | Ce | 0.02 | 300 | 0.1 | 85 | 12 |
| 60 | Ce | 0.05 | 500 | 0.2 | 90 | 20 |
| 61 | Ce | 0.1 | 600 | 0.3 | 80 | 21 |
| 62 | La | 0.1 | 500 | 0.2 | 90 | 21 |
|    | Ce | 0.1 |   |   |   |   |

EXAMPLE 63

A rolled sheet was produced in the same manner as in Example 47, except for using 0.3 g of metallic molybdenum in place of metallic aluminum. The resulting rolled sheet had an elongation of 22%.

EXAMPLES 64 TO 68

A chromium-based alloy ingot was prepared in the same manner as in Example 63, except for changing the amount or kind of the additive element as shown in Table 10 below. The elements used each had a purity of 99.9%. The alloy ingot was subjected to cross-rolling under conditions shown in Table 10. The tensile characteristics of the resulting rolled sheet is also shown in Table 10.

TABLE 10

| Example No. | Element Added Kind | Amount (atm %) | Rolling Conditions Temp. (°C.) | Output Rate (m/min) | Draft (%) | Elongation (%) |
|---|---|---|---|---|---|---|
| 64 | Mo | 0.3 | 500 | 0.1 | 90 | 21 |
| 65 | Mo | 0.5 | 600 | 0.2 | 80 | 18 |
| 66 | W | 0.1 | 500 | 0.1 | 95 | 22 |
| 67 | W | 1.0 | 500 | 0.5 | 75 | 15 |
| 68 | Mo | 0.2 | 600 | 0.2 | 90 | 23 |
|    | W | 0.5 |   |   |   |   |

EXAMPLE 69

A rolled sheet was produced in the same manner as in Example 63, except for using 6 g of metallic rhenium in place of metallic molybdenum. The resulting rolled sheet had an elongation of 24%.

EXAMPLES 70 TO 75

A chromium-based alloy ingot was prepared in the same manner as in Example 69, except for changing the amount or kind of the additive element as shown in Table 11 below. The elements used each had a purity of 99.9%. The alloy ingot was subjected to cross-rolling under conditions shown in Table 11. The tensile characteristics of the resulting rolled sheet is also shown in Table 11.

TABLE 11

| Example No. | Element Added Kind | Amount (atm %) | Rolling Conditions Temp. (°C.) | Output Rate (m/min) | Draft (%) | Elongation (%) |
|---|---|---|---|---|---|---|
| 70 | Re | 0.5 | 400 | 0.1 | 80 | 15 |
| 71 | Re | 3.0 | 600 | 0.2 | 95 | 21 |
| 72 | Mn | 0.3 | 300 | 0.1 | 90 | 23 |
| 73 | Mn | 1.0 | 500 | 0.3 | 75 | 12 |
| 74 | Tc | 2.0 | 400 | 0.1 | 80 | 18 |
| 75 | Re | 0.3 | 500 | 0.2 | 90 | 22 |
|    | Mn | 0.1 |   |   |   |   |

While the invention has been described in detail and with reference to specific embodiments thereof, it will be apparent to one skilled in the art that various changes and modifications can be made therein without departing from the spirit and scope thereof.

What is claimed is:

1. A weld material consisting of from 0.01 to 10% by weight of at least one element selected from the group consisting of (a) the elements belonging to the group IVb of the periodic table and (b) Al, with the balance consisting of chromium having a purity of 99.9% or higher.

2. A weld material consisting of from 0.01 to 8% by weight of at least one element selected from the group consisting of the elements belonging to the groups VIIb, VIII, and Ib of the periodic table, with the balance consisting of chromium having a purity of 99.9% or higher.

3. A weld material consisting of from 0.01 to 10% by weight of at least one element selected from the group consisting of (a) the elements belonging to the group IVb of the periodic able and (b) Al with from 0.01 to 8% by weight of at least one element selected from the group consisting of the elements belonging to the groups VIIb, VIII, and Ib of the periodic table, with the balance consisting of chromium having a purity of 99.9% or higher.

4. A weld material consisting of from 0.01 to 10% by weight of at least one element selected from the group consisting of Nb and Ta, with the balance consisting of chromium having a purity of 99.9% or higher.

5. A weld material consisting of from 0.01 to 8% by weight of at least one element selected from the group consisting of (a) the elements belonging to the groups VIIb, VIII, and Ib of the periodic table, and (b) Al, from 0.01 to 5% by weight of at least one element selected from the group consisting of Nb and Ta, with from 0.01 to 8% by weight of at least one element selected from rare earth elements, with the balance consisting of chromium having a purity of 99.9% or higher.

* * * * *